US006707383B2

(12) United States Patent
Flaherty

(10) Patent No.: US 6,707,383 B2
(45) Date of Patent: Mar. 16, 2004

(54) PERSONAL SENSORY REMINDER WITH CUSTOMIZABLE VOICE MESSAGE

(76) Inventor: Loretta M. Flaherty, 331 Birmingham Ave., Pittsburgh, PA (US) 15210

( * ) Notice: Subject to any disclaimer, the term of this patent is extended or adjusted under 35 U.S.C. 154(b) by 0 days.

(21) Appl. No.: 10/224,910

(22) Filed: Aug. 21, 2002

(65) Prior Publication Data

US 2003/0043035 A1 Mar. 6, 2003

Related U.S. Application Data

(60) Provisional application No. 60/316,478, filed on Aug. 31, 2001.

(51) Int. Cl.$^{7}$ ........................ G08B 21/00; G08B 23/00; G08B 13/14; B60Q 1/00

(52) U.S. Cl. .................... 340/573.1; 340/540; 340/545; 340/568.1; 340/457; 340/571; 340/692

(58) Field of Search ................................ 340/457–460, 340/540–573.1; 368/10, 243

(56) References Cited

U.S. PATENT DOCUMENTS

| | | | | |
|---|---|---|---|---|
| 4,023,151 A | * | 5/1977 | Markham | 340/692 |
| 4,755,789 A | * | 7/1988 | Paschal | 340/457.1 |
| 4,835,520 A | * | 5/1989 | Aiello | 340/545.6 |
| 4,912,457 A | * | 3/1990 | Ladd | 340/286.01 |
| 5,406,618 A | * | 4/1995 | Knuth et al. | 379/88.04 |
| 5,467,071 A | * | 11/1995 | Koenig | 340/433 |
| 5,861,808 A | * | 1/1999 | Lehmann et al. | 340/571 |
| 6,008,723 A | * | 12/1999 | Yassan | 340/438 |
| 6,091,326 A | * | 7/2000 | Castellano | 340/457.4 |
| 6,104,288 A | * | 8/2000 | Hopkins | 340/545.1 |
| 6,404,569 B1 | * | 6/2002 | Bachschmid et al. | 360/12 |

* cited by examiner

*Primary Examiner*—Jeffery Hofsass
*Assistant Examiner*—Lam Pham
(74) *Attorney, Agent, or Firm*—Webb Ziesenheim Logsdon Orkin & Hanson, P.C.

(57) ABSTRACT

A personal sensory reminder system includes an audio circuit that stores an audio message and which is responsive to a first signal for outputting the audio message. The system includes a switch that is responsive to an event for outputting a second signal and a clock circuit that is responsive to (i) the second signal for outputting the first signal to the audio circuit, (ii) the second signal for outputting the first signal to the audio circuit during an activation interval of the clock circuit and for withholding the output of the first signal to the audio circuit during a deactivation interval of the clock circuit or (iii) a change from a deactivation interval to an activation interval for outputting the first signal to the audio circuit.

10 Claims, 1 Drawing Sheet

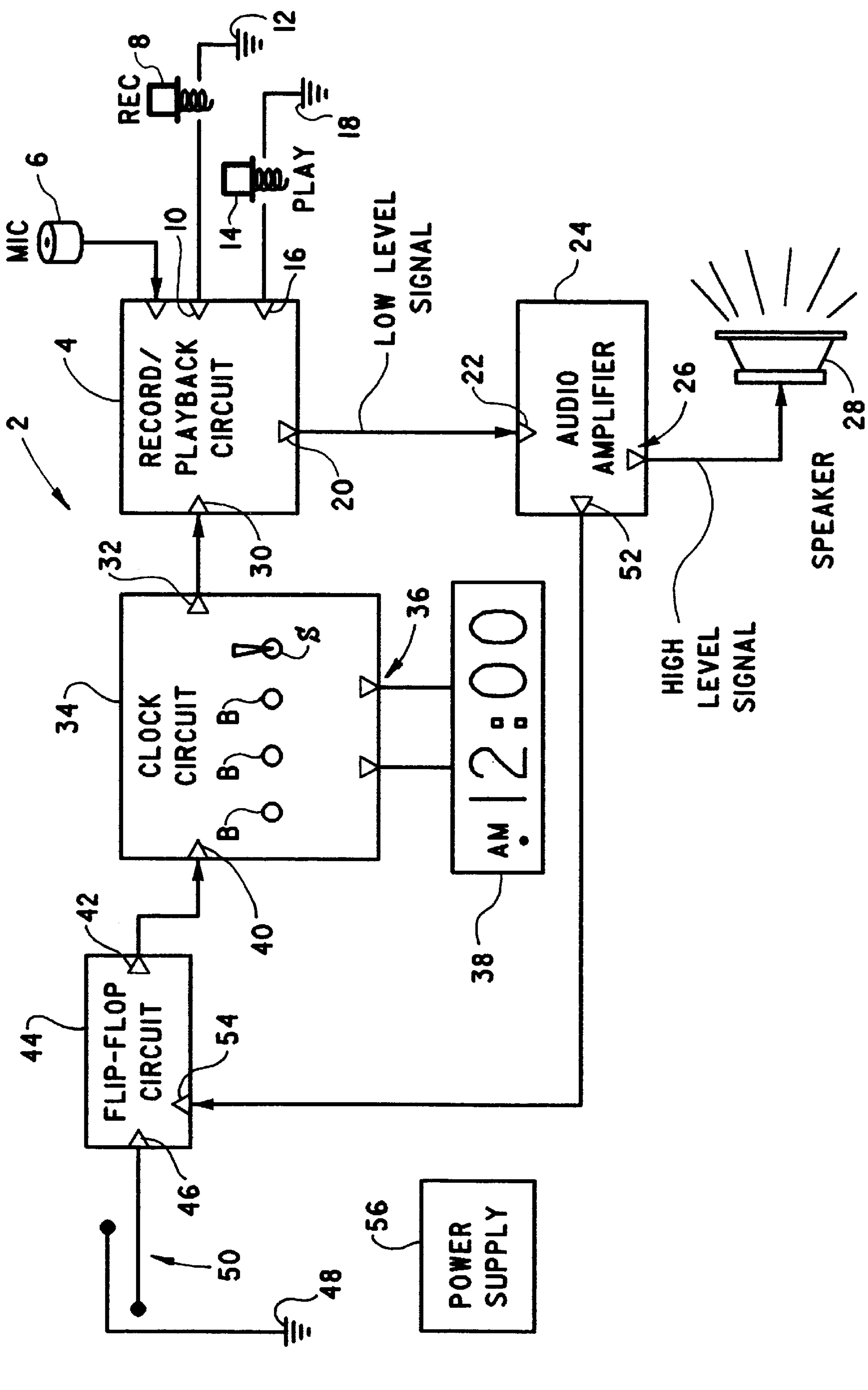
2
MIC
6
REC
8
10
12
PLAY
14
16
18
RECORD/ PLAYBACK CIRCUIT
4
20
LOW LEVEL SIGNAL
AUDIO AMPLIFIER
22
24
26
SPEAKER
28
HIGH LEVEL SIGNAL
30
32
52
CLOCK CIRCUIT
34
B
B
B
S
36
AM
12:00
38
40
42
FLIP-FLOP CIRCUIT
44
54
46
50
48
POWER SUPPLY
56

PERSONAL SENSORY REMINDER WITH CUSTOMIZABLE VOICE MESSAGE

CROSS REFERENCE TO RELATED APPLICATION

This application claims priority from U.S. Provisional Patent Application Ser. No. 60/316,478, filed Aug. 31, 2001, entitled "Personal Sensory Reminder With Customizable Voice Message".

BACKGROUND OF THE INVENTION

1. Field of the Invention

The present invention relates to a system that outputs an audible message at one or more predetermined times and/or in response to a predetermined event.

2. Description of the Related Art

It is well known that many individuals, either because of their age or condition, require prompting or reminding to perform one or more activities. For example, a person with Alzheimer's disease may need to be reminded to take medication at one or more times during the day. Similarly, teenage children may need to be reminded to telephone a parent or adult guardian upon arriving home from school. Still further, a person suffering from dementia who uses a walker may need to be reminded to use the walker when walking from one location to another location. Currently, absent the presence of a personal caregiver, no means presently exists for reminding individuals to perform one or more activities.

It is, therefore, an object of the present invention to provide a personal sensory reminder with customizable voice message to enable messages to be delivered to individuals to remind them to perform one or more activities in the absence of a personal caregiver being present. Still other objects of the invention will become apparent to those of ordinary skill in the art upon reading and understanding the following detailed description.

SUMMARY OF THE INVENTION

The invention is a personal sensory reminder system that includes an audio circuit which stores an audio message and which is responsive to a first signal for outputting the audio message. The system includes means responsive to an event for outputting a second signal and a clock circuit which is responsive to (i) the second signal for outputting the first signal to the audio circuit (ii) the second signal for outputting the first signal to the audio circuit during an activation interval programmed into the clock circuit and for withholding or terminating the output of the first signal to the audio circuit during a deactivation interval programmed into the clock circuit, and (iii) a change from a deactivation interval to an activation interval for outputting the first signal to the audio circuit.

The means for outputting the second signal can include a latch circuit for supplying the second signal to the clock circuit and a means responsive to the event for triggering the latch circuit to output the second signal to the clock circuit. The triggering means can be one of a pressure sensitive mat, an infrared detector, a proximity switch, a break beam sensor, a heat sensor, a vibration sensor, a light level sensor and a fluid level sensor.

The system can further include means for amplifying the audio message and means for resetting the latch circuit. The clock circuit can further include means for programming the clock circuit with a time of day, each activation interval and each deactivation interval.

A display can be operatively connected to the clock circuit for displaying at least one of the time of day programmed into the clock circuit, an activation time programmed into the clock circuit and a deactivation time programmed into the clock circuit.

Means can be provided for inputting the audio message into the audio circuit. This input means can include a microphone connectable to the audio circuit, with the audio circuit storing the audio message received by the microphone when a record input of the audio circuit is connected to a reference voltage. Lastly, the audio circuit can be responsive to the connection of a reference voltage to a playback input of the audio circuit for outputting the audio signal independent of the first signal.

DETAILED DESCRIPTION OF THE DRAWING

The FIGURE is a block diagram of a personal sensory reminder system in accordance with the present invention.

DETAILED DESCRIPTION OF THE INVENTION

With reference to FIG. 1, a personal sensory reminder 2 in accordance with the present invention includes a record/playback or audio circuit 4 comprised of appropriate circuitry for digitally recording input received from a microphone 6 in response to activation of a record button 8. Microphone 6 can be, for example, a miniature electret microphone. Record button 8 is connected between a record input 10 of record/playback circuit 4 and an appropriate reference voltage 12, such as ground. In response to activation of record button 8, reference voltage 12 is connected to record input 10 via record button 8. Connecting reference voltage 12 to record input 10 causes record/playback circuit 4 to initiate recording an input signal received from microphone 6. More specifically, in response to activating record button 8, record/playback circuit converts the analog signal output from microphone 6, in response to microphone 6 receiving an audio message, into a digital equivalent of the audio signal which record/playback circuit 4 stores in appropriate digital memory (not shown) for subsequent retrieval. Deactivation of record button 8 terminates digital recording of the output of microphone 6.

A playback button 14 is connected between a playback input 16 of record/playback circuit 4 and a reference voltage 18, such as ground. When playback button 14 is activated, reference voltage 18 is connected to playback input 16. In response to connecting reference voltage 18 to playback input 16, record/playback circuit 4 retrieves the digital data stored in the digital memory in the order in which it was stored in digital memory and converts the retrieved digital data into a low level analog signal which corresponds to the analog signal received from microphone 6 during activation of record button 8. This low level analog signal is supplied to a playback output 20 of record/playback circuit 4.

Playback output 20 is connected to low level input 22 of an audio amplifier 24. Audio amplifier 24 amplifies the low level signal received at low level input 22 and outputs a high level signal on a high level output 26 of audio amplifier 24. A speaker 28 is connected to receive the high level signal output from high level output 26 of audio amplifier 24. Speaker 28 converts the high level signal into an audio message corresponding to the audio message received by microphone 6 when record button 8 was activated to store the digital data form of the audio message in the digital memory of record/playback circuit 4.

Record/playback circuit 4 has a second playback input 30 connected to a binary output 32 of a clock circuit 34. Clock circuit 34 can have outputs 36 connected to a numerical display 38 that is capable of displaying a time of day. Clock circuit 34 preferably includes a real time clock generator (not shown) and necessary inputs (not shown) for connection to buttons B, switches S, and the like for setting clock circuit 34 to an appropriate time of day. Clock circuit 34 can also be configured so that by appropriate activation of the buttons B and switches S connected to clock circuit 34, activation times/intervals or deactivation times/intervals (discussed hereinafter) can be recorded in clock circuit 34 for subsequent use.

Clock circuit 34 can be configured so that when the time of day enters an activation time/interval, clock circuit 34 outputs on binary output 32 a signal that causes record/playback circuit 4 to initiate the retrieval and conversion of the digitally stored data into the low level signal for amplification by audio amplifier 24. In this manner, the audio message stored digitally in record/playback circuit 4 can be generated at appropriate times during the day for any desired purpose, such as to remind an Alzheimer's patient to take medication at prescribed times.

Clock circuit 34 can also include a binary input 40 connected to a binary output 42 of a flip-flop or latch circuit 44. Clock circuit 34 can be configured so that in response to receiving an appropriate binary signal at binary input 40 from flip-flop 44 during an activation time/interval of clock circuit 34, clock circuit 34 outputs to record/playback circuit 4 a corresponding binary signal which causes record/playback circuit 4 to initiate the retrieval and conversion of the digital data stored therein into the low level signal supplied to audio amplifier 24.

Flip-flop circuit 44 includes a binary input 46 that can be connected to an appropriate reference voltage 48, such as ground, via a triggering means 50. In response to activation of triggering means 50, reference voltage 48 is connected to binary input 46 of flip-flop circuit 44 whereupon binary output 42 changes from a first binary state to a second binary state in a manner known in the art. If the time of day established by the real time clock of clock circuit 34 corresponds to an activation time/interval of clock circuit 34, or if clock circuit 34 is configured in a bypass mode whereupon any binary signal received on binary input 40 results in a corresponding signal output on binary output 32, in response to binary input 40 of clock circuit 34 receiving the binary changing signal from binary output 42 of flip-flop circuit 44, the corresponding binary changing signal is output on binary output 32 of clock circuit 34. This binary changing signal output on binary output 32 causes record/playback circuit 4, audio amplifier 24 and speaker 28 to coact to generate the audio message corresponding to the digital data stored in record/playback circuit 4.

If, however, the binary changing signal output on binary output 42 of flip-flop circuit 44 is received by binary input 40 of clock circuit 34 at a time of day corresponding to a deactivation time/interval of clock circuit 34, a corresponding binary signal is not produced on binary output 32 of clock circuit 34 until the time of day corresponds to an activation interval of clock circuit 34. In this manner, the audio message will only be produced during an activation interval of clock circuit 34. It should be noted, however, that if triggering means 50 is activated during a deactivation interval of clock circuit 34, upon clock circuit 34 entering into an activation interval, the binary changing signal received at binary input 40 during the deactivation interval of clock circuit 34 will produce a corresponding binary changing signal on binary output 32 when clock circuit 34 exits the deactivation interval and enters the activation interval.

From the foregoing, it can be seen that clock circuit 34 has a variety of different operation modes, namely, a bypass mode where a signal is produced at binary output 32 in response to receipt of a binary changing signal at binary input 40; an activation/deactivation time/interval mode where a signal received at binary input 40 when clock circuit 34 is in an activation interval causes clock circuit 34 to produce a change in the binary state of binary output 32; and an activation time mode where clock circuit 34 causes binary output 32 to change binary state in response to the time of day programmed into clock circuit 34 entering an activation time/interval, regardless of the state of the binary signal, if any, at binary input 40.

Audio amplifier 24 includes a reset output 52 connected to a reset input 54 of flip-flop circuit 44. Audio amplifier 24 is configured so that each time a low level signal is received from record/playback circuit 4, audio amplifier 24 generates a binary reset signal at reset output 52. This binary reset signal causes flip-flop circuit 44 to initialize to a starting state in preparation to be responsive to the next activation of triggering means 50.

Lastly, a power supply 56 is provided to supply electrical power to record/playback circuit 4, audio amplifier 24, clock circuit 34, numerical display 38 and flip-flop circuit 44. Power supply 56 can be a self-contained power supply, such as a battery, or a converting power supply which converts AC power from an electrical outlet into DC power usable by the components of personal sensory reminder 2.

Triggering means 50 can be any suitable device that can connect binary input 46 of flip-flop circuit 44 to reference voltage 48. Examples of such devices can include, without limitation, a pressure sensitive mat, an infrared detector, a proximity switch, a break beam sensor (infrared, laser, incandescent, optic, and the like), a heat detector, a vibration sensor, a day/night sensor or a fluid level sensor.

As can be seen, the present invention provides a personal sensory reminder with customizable voice message that enables messages to be delivered to individuals to remind them to perform one or more activities in the absence of a personal caregiver being present.

The invention has been described with reference to the preferred embodiment. Obvious modifications and alterations will occur to others upon reading and understanding the preceding description. It is intended that the invention be construed as including all such modifications and alterations insofar as they come within the scope of the appended claims or the equivalents thereof.

The invention is claimed to be:

1. A personal sensory reminder system comprising:

an audio circuit storing an audio message and responsive to a first signal for outputting the audio message;

means responsive to an event for outputting a second signal; and a clock circuit responsive to at least two of:

(i) the second signal for outputting the first signal to the audio circuit independent of an activation interval or a deactivation interval of the clock circuit;

(ii) the second signal for outputting the first signal to the audio circuit during the activation interval of the clock circuit and for withholding the output of the first signal to the audio circuit during the deactivation interval of the clock circuit; and (iii) a change from the deactivation interval to the activation interval for outputting the first signal to the audio circuit.

2. The system of claim 1, wherein the output means includes:

a latch circuit for supplying the second signal to the clock circuit; and means responsive to the event for triggering the latch circuit to output the second signal to the clock circuit.

3. The system of claim 2, wherein the trigger means is one of a pressure sensitive mat, an infrared detector, a proximity switch, a break beam sensor, a heat sensor, a vibration sensor, a light level sensor and a fluid level sensor.

4. The system of claim 1, further including means for amplifying the audio message.

5. The system of claim 2, further including means for resetting the latch circuit.

6. The system of claim 1, wherein the clock circuit includes means for programming the clock circuit with a time of day, each activation interval and each deactivation interval.

7. The system of claim 1, further including a display operatively connected to the clock circuit for displaying at least one of a time of day programmed into the clock circuit, an activation time programmed into the clock circuit and a deactivation time programmed into the clock circuit.

8. The system of claim 1, further including means for inputting the audio message into the audio circuit.

9. The system of claim 8, wherein the input means includes a microphone connectable to the audio circuit, the audio circuit storing the audio message received by the microphone when a record input of the audio circuit is connected to a reference voltage.

10. The system of claim 1, wherein the audio circuit is responsive to the connection of a reference voltage to a playback input of the audio circuit for outputting the audio signal independent of the first signal.

* * * * *